United States Patent
Murata et al.

(10) Patent No.: US 12,358,360 B2
(45) Date of Patent: Jul. 15, 2025

(54) BATTERY COOLING AIR DISCHARGE STRUCTURE

(71) Applicant: Nissan Motor Co., Ltd., Yokohama (JP)

(72) Inventors: Michitomo Murata, Kanagawa (JP); Makoto Oogami, Kanagawa (JP); Jyunichi Hanawa, Kanagawa (JP); Masaya Kondo, Kanagawa (JP); Haruka Tonomura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 375 days.

(21) Appl. No.: 17/999,938

(22) PCT Filed: May 29, 2020

(86) PCT No.: PCT/JP2020/021403
§ 371 (c)(1),
(2) Date: Nov. 28, 2022

(87) PCT Pub. No.: WO2021/240803
PCT Pub. Date: Dec. 2, 2021

(65) Prior Publication Data
US 2023/0211655 A1    Jul. 6, 2023

(51) Int. Cl.
*B60K 1/04*    (2019.01)
*B62D 25/20*    (2006.01)
(Continued)

(52) U.S. Cl.
CPC .............. *B60K 1/04* (2013.01); *B62D 25/20* (2013.01); *H01M 10/613* (2015.04);
(Continued)

(58) Field of Classification Search
CPC ............... B60K 1/04; B60K 2001/005; B60K 2001/0422; H01M 10/613; H01M 10/625; H01M 10/6561; B62D 25/20
(Continued)

(56) References Cited

U.S. PATENT DOCUMENTS 7,419,209 B1 *  9/2008  Mangiapane ....... H01M 50/244
                                                        296/63
8,297,387 B2 * 10/2012  Kadoi ..................... B60L 58/18
                                                        180/68.5
(Continued)

FOREIGN PATENT DOCUMENTS

CN    101318464 A    12/2008
CN    101547811 A     9/2009
(Continued)

OTHER PUBLICATIONS

Office Action of Mar. 5, 2025 of corresponding Chinese Patent Application No. 202080101536.6.

*Primary Examiner* — Hau V Phan
(74) *Attorney, Agent, or Firm* — Global IP Counselors, LLP (57) ABSTRACT

A battery cooling air discharge structure is configured to suppress noise of the cooling air for a battery. The battery cooling air discharge structure includes a floor panel, a floor, a plurality of rows of seats and an exhaust duct. The floor panel bottom forms a lower part of a vehicle body of a vehicle and enables placement of a battery. The floor panel top portion is arranged above the floor panel to allow placement of the battery between the floor panel top portion and the floor panel. The seats are arranged on the floor. The exhaust duct discharges battery cooling air. The exhaust duct has an exhaust port located between the floor and a seating part of a rear seat that constitutes the seats. An underside of (Continued)

the seating part has a notch. At least an area of the exhaust port is located adjacent to the notch.

5 Claims, 6 Drawing Sheets

(51) Int. Cl.
*H01M 10/613* (2014.01)
*H01M 10/625* (2014.01)
*H01M 10/6561* (2014.01)
*B60K 1/00* (2006.01)

(52) U.S. Cl.
CPC ..... *H01M 10/625* (2015.04); *H01M 10/6561* (2015.04); *B60K 2001/005* (2013.01); *B60K 2001/0422* (2013.01); *H01M 2220/20* (2013.01)

(58) Field of Classification Search
USPC ........................................................ 180/68.5
See application file for complete search history.

(56) References Cited

U.S. PATENT DOCUMENTS

| | | | |
|---|---|---|---|
| 9,126,477 B2* | 9/2015 | Zhu | B60N 2/646 |
| 9,914,336 B2* | 3/2018 | Smith | B60L 50/66 |
| 9,997,753 B2* | 6/2018 | Nomura | B60K 1/04 |
| 10,486,526 B2* | 11/2019 | Ajisaka | B60K 11/04 |
| 11,192,445 B2* | 12/2021 | Kano | B60K 1/04 |
| 11,312,205 B2* | 4/2022 | Aoki | B60K 11/06 |
| 2008/0139102 A1* | 6/2008 | Major | B60H 1/00278 454/139 |
| 2008/0197661 A1* | 8/2008 | Wozniak | B60N 3/042 296/97.23 |
| 2008/0297136 A1* | 12/2008 | Gaboury | H01M 10/625 454/69 |
| 2010/0276220 A1* | 11/2010 | Kubota | B60L 50/64 180/68.1 |
| 2012/0055725 A1* | 3/2012 | Mizoguchi | H01M 10/625 180/68.5 |
| 2013/0092348 A1* | 4/2013 | Bito | H01M 10/6562 165/41 |
| 2015/0101789 A1* | 4/2015 | Enomoto | B60H 1/039 236/35 |
| 2016/0261011 A1* | 9/2016 | Tsuchiya | H01M 10/613 |
| 2016/0294026 A1* | 10/2016 | Tsuchiya | H01M 10/625 |
| 2016/0301120 A1* | 10/2016 | Katsuno | H01M 10/625 |
| 2017/0207120 A1* | 7/2017 | Boyanov | H01L 23/485 |
| 2018/0015806 A1* | 1/2018 | Yasuda | B60L 58/26 |
| 2018/0111499 A1* | 4/2018 | Wada | B60K 1/04 |
| 2018/0345759 A1* | 12/2018 | Okumura | B60K 11/06 |
| 2019/0393572 A1* | 12/2019 | Kuzuhara | B60K 11/06 |

FOREIGN PATENT DOCUMENTS

| | | |
|---|---|---|
| JP | 2017-165305 A | 9/2017 |
| JP | 2017-190044 A | 10/2017 |

* cited by examiner

BATTERY COOLING AIR DISCHARGE STRUCTURE

CROSS-REFERENCE TO RELATED APPLICATIONS

This application is a U.S. national stage application of International Application No. PCT/JP2020/021403, filed on May 29, 2020.

BACKGROUND

Technical Field

The present invention relates to a battery cooling air discharge structure.

Background Information

In recent years, electric and hybrid vehicles have been developed as vehicles with low fuel consumption and exhaust emissions. Hybrid cars are equipped with an engine and a motor, and are structured to be used selectively. Hybrid cars and other vehicles are equipped with a battery. When a battery is installed in the vehicle, the battery must be cooled. In this regard, the prior art includes attempts to cool the battery by means of an arrangement of air intake ducts and exhaust ducts (see Japanese Laid-Open Patent Application No. 2017-190044).

SUMMARY

The inventors have focused on the fact that as the sound of the air required for cooling the battery grows louder, the noise of the air flow increases, making it difficult to suppress the sound due to the increased sound of the flowing air, and have conducted extensive studies on this problem.

In consideration of the circumstance described above, an object of at least one embodiment of the present invention is to provide a battery cooling air discharge structure that can suppress noise even if the amount of cooling air that is required for the battery becomes relatively high.

One embodiment of the present invention is a battery cooling air discharge structure. The battery cooling air discharge structure comprises a floor panel, a floor, seats, and an exhaust duct. The floor panel constitutes the lower part of the vehicle body and is configured to enable placement of the battery. The floor is located above the floor panel and is configured to allow placement of the battery between the floor and the floor panel. A plurality of rows of the seats are installed on the floor. The exhaust duct discharges air that cooled the battery. The exhaust duct has an exhaust port arranged between the floor and the seating part of the rear seat that constitutes the seats.

BRIEF DESCRIPTION OF THE DRAWINGS

Referring now to the attached drawings which form a part of this original disclosure.

DETAILED DESCRIPTION OF EMBODIMENTS

An embodiment of the present invention will be explained below with reference to the accompanying drawings. In the explanations of the drawings, the same elements have been assigned the same reference symbols, and redundant explanations have been omitted. The embodiment shown here is an example implementation of the technical concept of the present invention and does not limit the present invention. Thus, all other implementable forms, methods of use, operation techniques, etc., that can be conceived of by a person skilled in the art, etc., without departing from the essence of the present invention are included within the scope and essence of the present invention, and are also included in the invention recited in Claims and its equivalents.

Further, the drawings appended to the Specification may, for the sake of convenience, ease of understanding and illustration, be schematically represented, where the scale, length-to-width ratio, shape, etc., of the actual objects are changed, as appropriate, but are only examples and do not limit the interpretation of the present invention.

Further, in the figures, the orientation is indicated by the use of arrows represented by X, Y, and Z (coordinate system). That is, the "Z direction" is the vertical direction, the "X direction" is orthogonal to the Z direction and parallel to the horizontal plane, and the "Y direction" is orthogonal to the Z direction and parallel to the horizontal plane (direction orthogonal to the X direction).

Thus, for example, the direction of the arrow indicated by X represents the front-rear direction of vehicle 100, where plus indicates rear to front. Y represents the width direction of the vehicle 100, where plus indicates rightward. Z represents the height direction of the vehicle 100, where plus indicates upward.

In the following description, ordinal numbers such as "first" and "second" are used for the sake of convenience and, unless otherwise specified, do not denote any particular order.

The vehicle 100 equipped with the battery cooling air discharge structure may be a vehicle, such as a hybrid electric vehicle (HEV) that uses a combination of an internal combustion engine and a battery-driven motor as a driving source, an electric vehicle (EV) that travels by means of a battery-driven motor, and the like.

Figure 1:
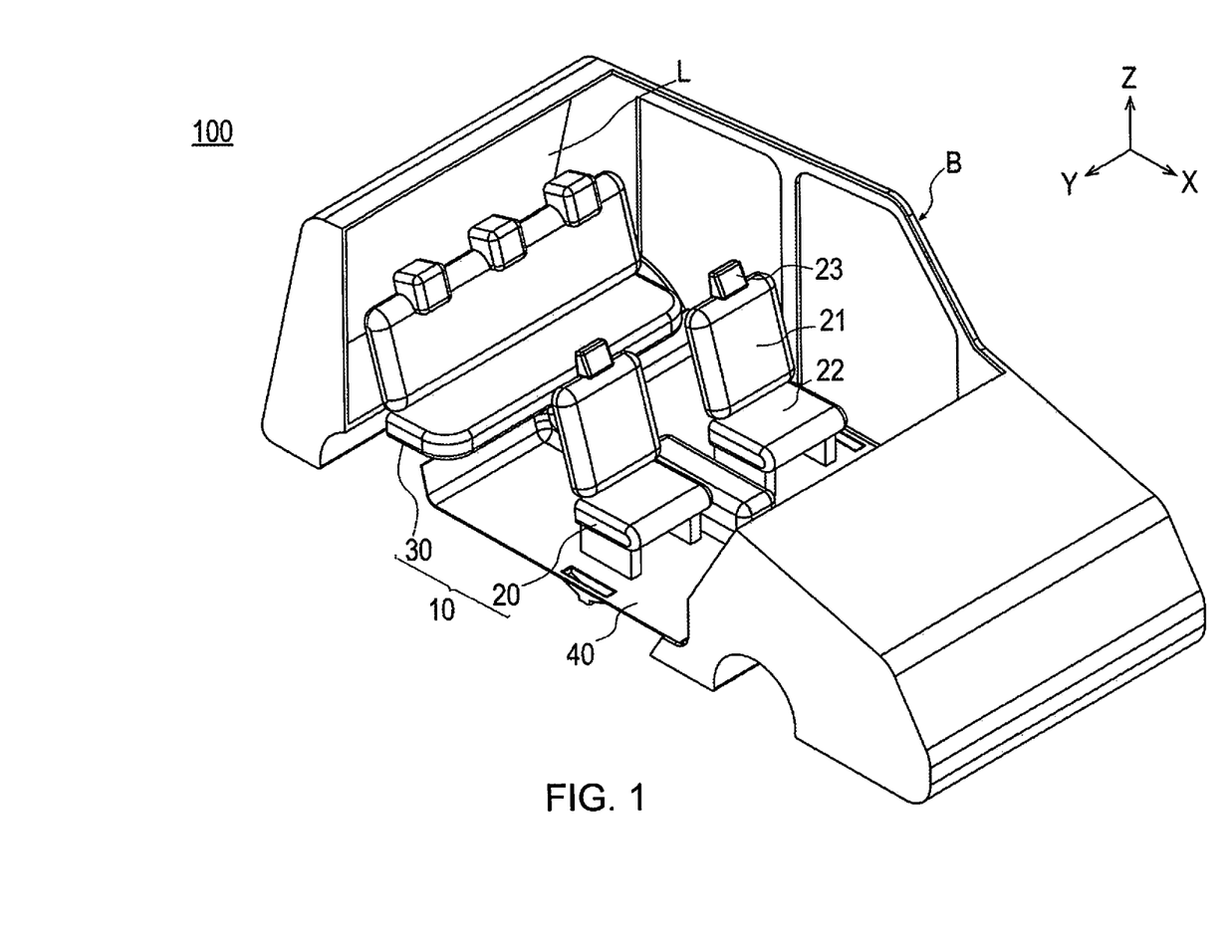
FIG. 1 is a perspective view of the interior of a vehicle equipped with a battery cooling air discharge structure according to first embodiment of the present invention, schematically illustrated by cutting away a portion of an exterior wall of the vehicle body.
Figure 5:
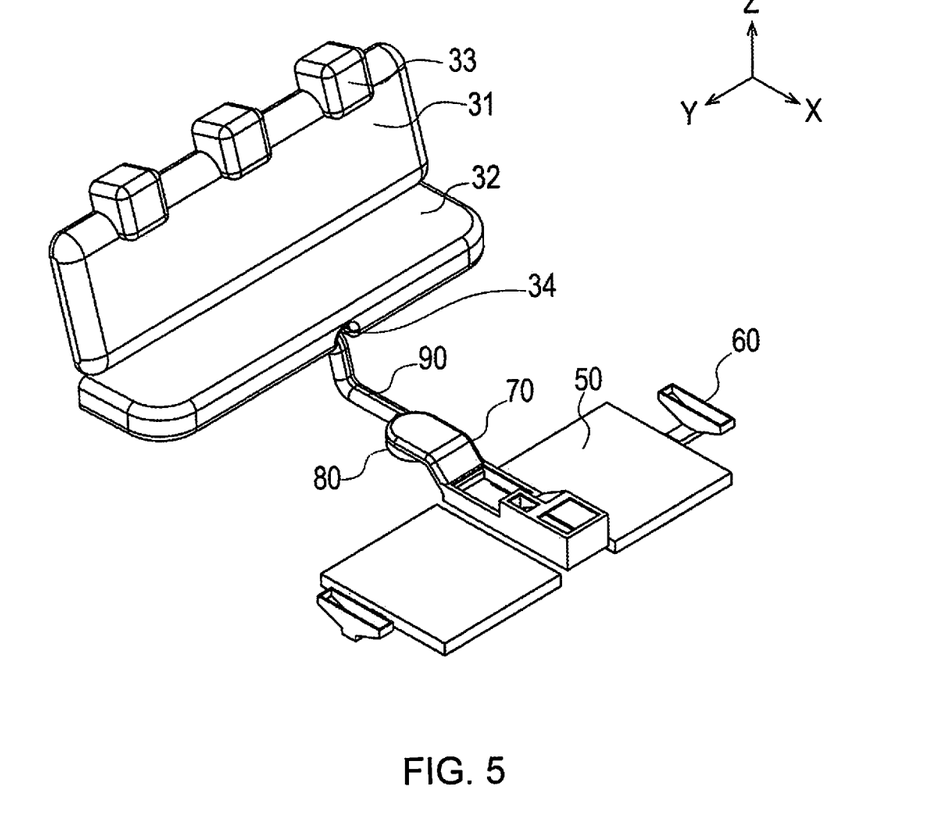
FIG. 5 is a perspective view showing an intake duct, a battery, a fan, and an exhaust duct, constituting the battery cooling air discharge structure, as well as the rear seat, etc.

As shown in FIGS. 1 and 5, the vehicle 100 comprises vehicle body B, seats 10, a floor consisting of a floor panel top portion 40 and a floor panel bottom portion fp, a battery 50, air intake ducts 60, a connecting duct 70, an exhaust fan 80, and an exhaust duct 90. A detailed description follows.

The vehicle body B constitutes a framework that separates the passenger and luggage areas of the vehicle 100 from the outside. Although the vehicle body B of the vehicle 100 is configured as a compact car, such as a hatchback in the present embodiment, the type of vehicle (the shape and structure of the vehicle body B) is not particularly limited as long as the vehicle has structures that are the same as the seats 10, floor (floor panel top portion 40 and floor panel bottom portion fp), and the exhaust duct 90, described further below.

Figure 2:
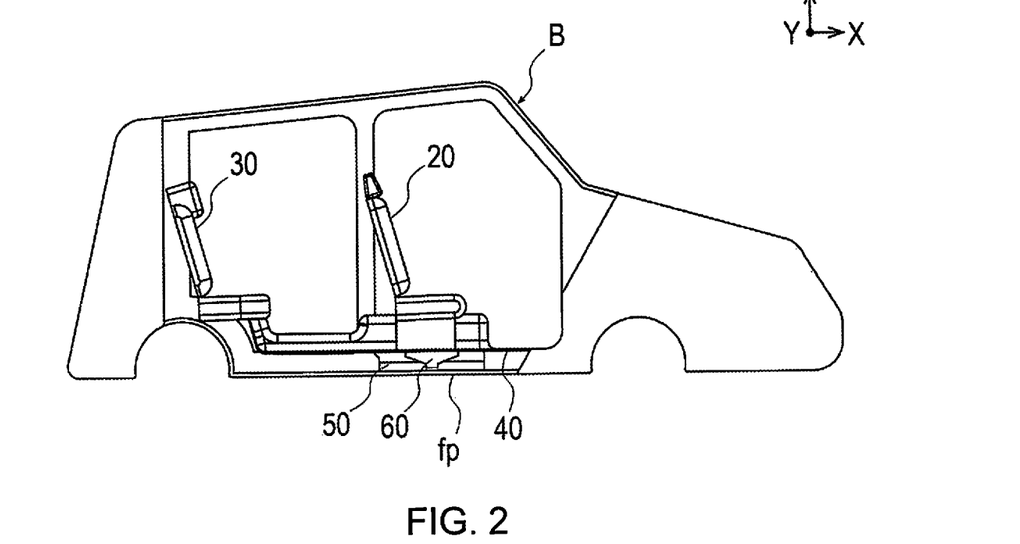
FIG. 2 is a side view of FIG. 1.
Figure 3:
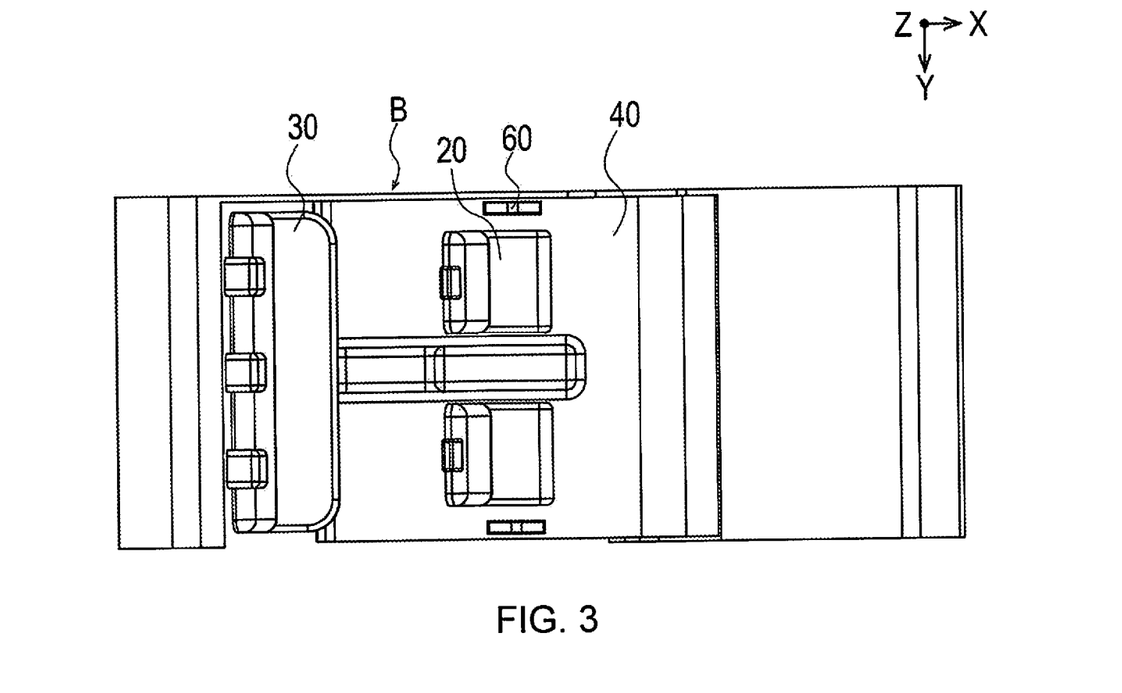
FIG. 3 is a plan view of FIG. 1.

As shown in FIG. 2, in the vehicle body B, the lower part of the vehicle 100 is provided with the floor panel bottom portion fp on which the battery 50, described further below, can be placed.

The seats 10 are configured to be installed on the floor panel top portion 40 of the vehicle 100 in a plurality of rows. In the present embodiment, as shown in FIG. 1, the seats 10, as seen from the front, include front seats 20 that correspond to a first row of seats, and a rear seat 30 that corresponds to a second row of seats.

The front seats 20 are installed to be movable at least in the front-rear direction X relative to the floor panel top portion 40. As shown in FIG. 1, the front seats 20 include a backrest 21 against which an occupant's back can be rested, a seating part 22 on which the occupant's buttocks can be seated, and a headrest 23 on which the occupant's head can be rested. In the present embodiment, the front seats 20 are provided with independent driver and passenger seats.

As shown in FIG. 1, a luggage space L (also called luggage room or cargo area) connected to the passenger compartment is provided behind the rear seat 30.

Figure 4:
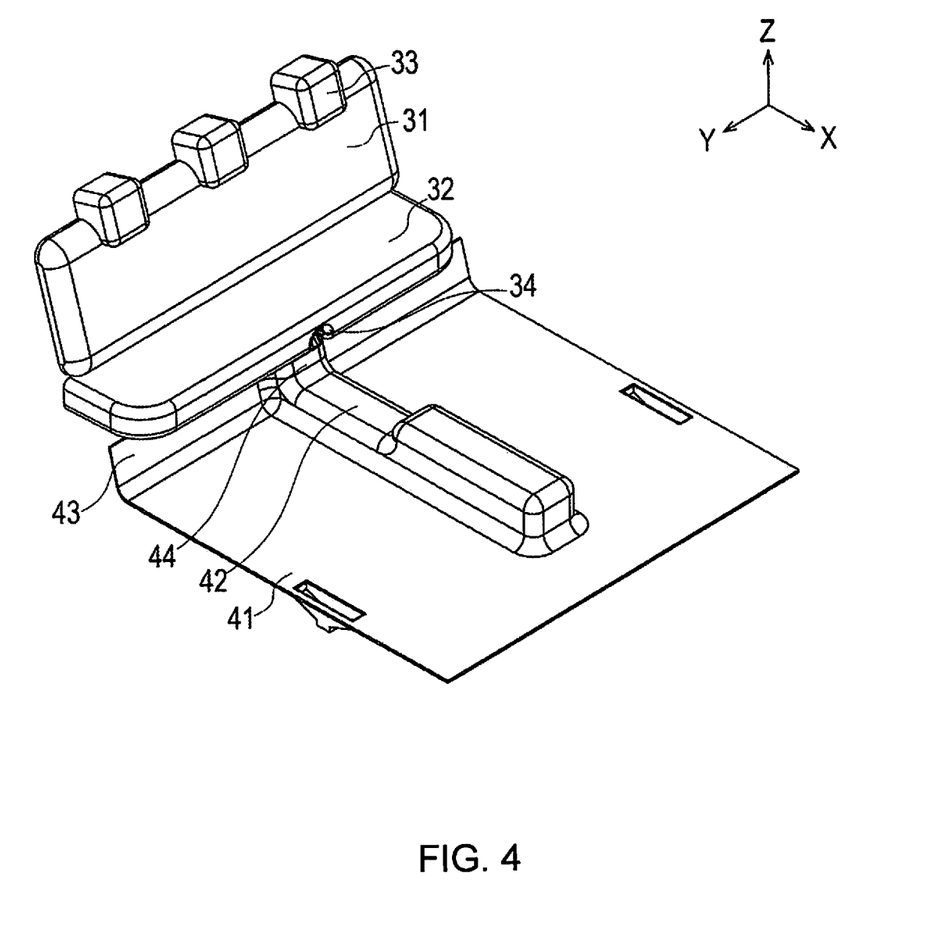
FIG. 4 is a perspective view showing a rear seat, a floor, etc., of the vehicle.

As shown in FIGS. 4, 5, etc., the rear seat 30 includes a backrest 31, a seating part 32, and headrests 33. Unlike the front seats 20, the rear seat 30 is configured as a so-called bench seat, in which the left and right seats are connected. Thus, the backrest 31 and the seating part 32 are configured such that the backs and buttocks of a plurality of occupants can be placed on the rear seat 30.

Figure 6:
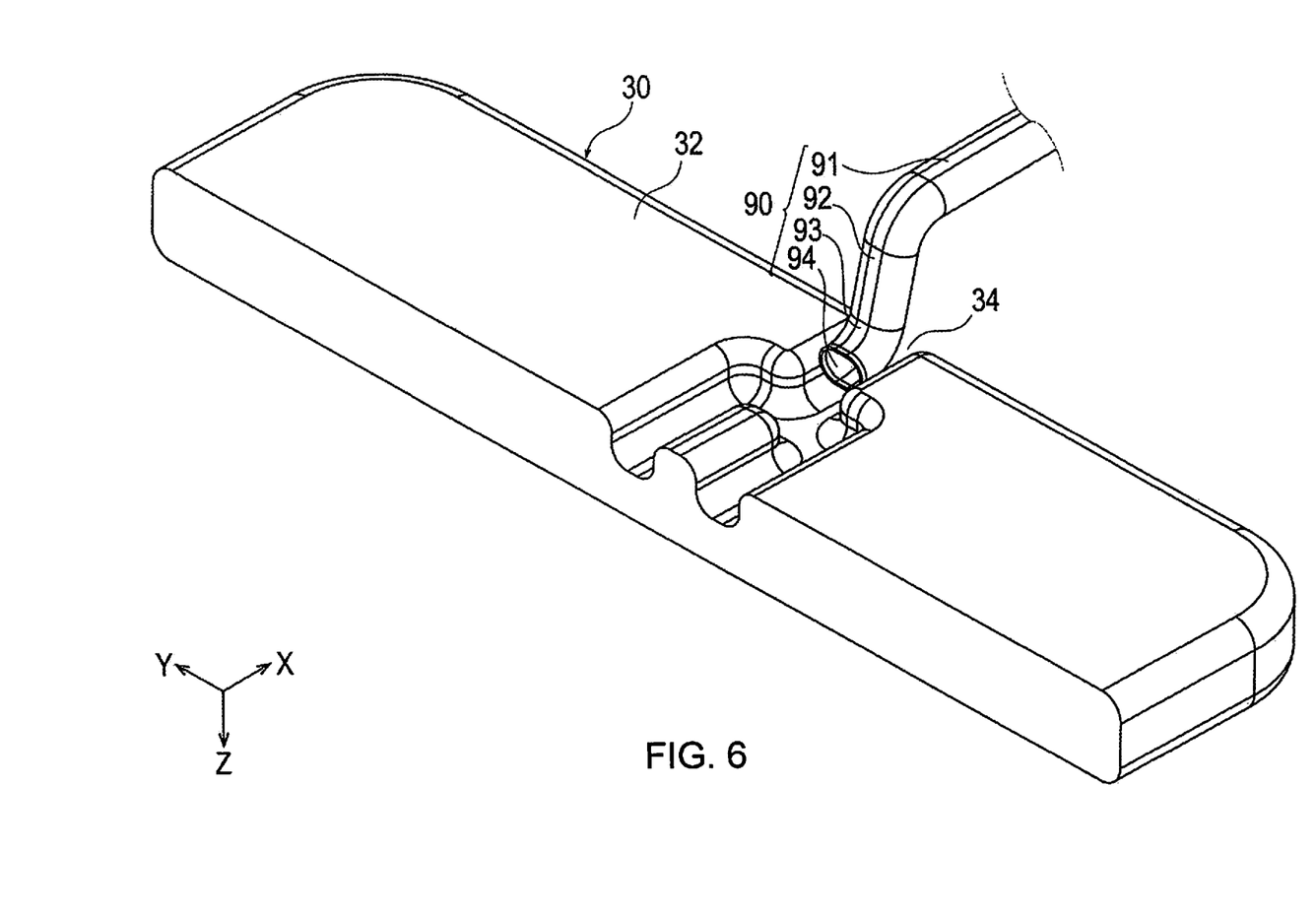
FIG. 6 is a perspective view showing the exhaust duct and a seating part of the rear seat turned, upside down.
Figure 7:
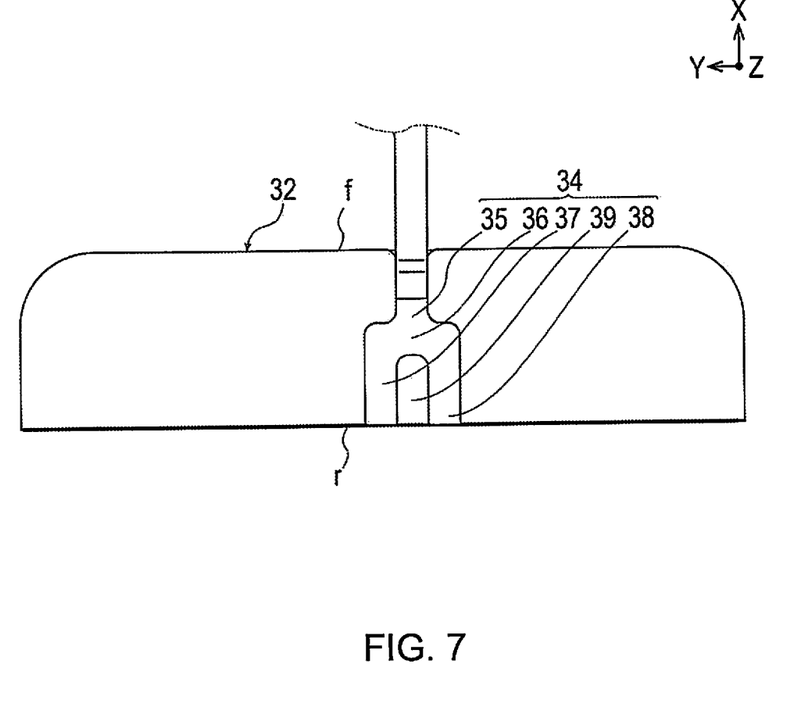
FIG. 7 is a bottom view of FIG. 6.

As shown in FIGS. 4, 5, etc., the underside of the seating part 32 has a notch 34 in the height direction Z. The notch 34 has a concave shape, as shown in FIGS. 6, 7, etc. As shown in FIG. 6, the concave shape of the notch 34 is configured to face downward in the height direction Z. As shown in FIG. 7, the notch 34 has a first concave portion 35, an enlarged portion 36, a second concave portion 37, a third concave portion 38, and a convex portion 39.

As shown in FIGS. 6 and 7, the first concave portion 35 is configured to allow the adjacent placement of an exhaust port 94 of the exhaust duct 90. As shown in FIG. 7, the first concave portion 35 is provided on the front side of the seating part 32 in the front-rear direction X. As shown in FIGS. 5 and 7, in the present embodiment, the first concave portion 35 is configured to be formed to extend through to a front end portion f of the seating part 32. However, as long as the exhaust duct 90, described further below, can be disposed below the seating part 32 in the height direction Z, the first concave portion 35 need not be formed to extend through to front end portion f of the seating part 32.

The enlarged portion 36 is provided continuous with the first concave portion 35 behind the first concave portion 35 in the front-rear direction X. The enlarged portion 36 is configured such that that the cross-sectional shape of the notch from the first concave portion 35 is enlarged in the front-rear direction X. The enlarged portion 36 is configured such that the shape of the notch in the lower surface of the seating part 32 leads from the first concave portion 35 to the second concave portion 37 and the third concave portion 38 rearward in the front-rear direction X.

The second concave portion 37 and the third concave portion 38 are provided in a continuous (connected) manner from the enlarged portion 36. As shown in FIG. 7, the second concave portion 37 and the third concave portion 38 are configured to extend substantially linearly to rear end portion r of the seating part 32 in the front-rear direction X of the vehicle 100. The second concave portion 37 and the third concave portion 38 preferably have the same cross-sectional shapes of the concave portions. However, as long as the shapes are not extremely different, there may be slight differences in the cross-sectional shapes (for example, one may be a perfect circle while the other is an ellipse, or, in the case that the cross-sectional shapes are rectangular, the aspect ratio (length-to-width ratio) of the rectangular cross section may be different).

The convex portion 39 bifurcates the notch connected to the enlarged portion 36 into the second concave portion 37 and the third concave portion 38. The position of the convex portion 39 is between the second concave portion 37 and the third concave portion 38 in the width direction Y in the present embodiment.

By means of such a configuration, air from the exhaust port 94 of the exhaust duct 90 can be directed along the first concave portion 35 and the enlarged portion 36, to the second concave portion 37 and the third concave portion 38, which correspond to branch flow paths, and from there into the luggage space L.

The convex portion 39 can be positioned the buttocks (hip point) of the occupant in the rear seat 30. The convex portion 39 may be referred to as a pad, from the standpoint of being able to support the occupant's hip area.

The floor panel top portion 40 is arranged above the floor panel bottom portion fp in the height direction Z. The floor panel top portion 40 is configured to allow the battery 50 to be positioned between the floor panel top and the floor panel bottom portion fp. The floor panel top portion 40 constitutes the lower part of the vehicle cabin of the vehicle 100. A carpet, floor mats, etc., can be placed on the floor panel top portion 40. As shown in FIG. 4, the floor panel top portion 40 has a horizontal portion 41, a raised portion 42, and rising portions 43, 44.

The horizontal portion 41 is the part of the vehicle cabin where the occupants' feet can be placed, and where the above-described carpet, etc., can be installed.

The raised portion 42 is provided in the central area (middle portion) of the horizontal portion 41 in the width direction Y. The raised portion 42 is made higher than the horizontal portion 41 in the height direction Z in order to arrange thereunder the exhaust fan 80, etc., of the battery 50, described further below.

The rising portions 43, 44 are positioned behind the horizontal portion 41 and the raised portion 42 in the front-rear direction X, and are positioned in the area below the seating part 32 of the rear seat 30. The rising portions 43, 44 are formed such that the height in the height direction Z gradually increases rearward in the front-rear direction X relative to the horizontal portion 41. The rising portion 44 is arranged such that the exhaust duct 90 is not exposed to the vehicle cabin (passenger compartment). The rising portions 44 is formed so as to rise higher in the height direction Z than the rising portion 43 below the seating part 32.

FIG. 5, which corresponds to the configuration described below, corresponds to FIG. 4 without the floor panel top portion 40.

The battery 50 is an energy storage device that supplies electrical energy to a motor, not shown, and is charged by the driving force of the engine and the recovery of regenerative energy. As shown in FIG. 2, in the present embodiment, the battery 50 is configured to be located near the lower part of the front seats 20 of the seats 10.

The air intake ducts 60 are configured for the intake of air and other gases used for cooling the battery 50. In the present embodiment, the air intake ducts 60 are configured to be located near the lower part of the front seats 20 of the seats 10 and outwardly in the width direction Y from the battery 50. The openings of the air intake ducts 60 may be located in essentially the same plane (same height) as the horizontal portion 41 of the floor panel top portion 40.

The connecting duct 70 is configured for taking in air and other gases that flow in from the air intake duct 60 and pass through the battery 50. In the present embodiment, the connecting duct 70 is arranged between the battery 50 and the exhaust fan 80 in the front-rear direction X. For example, the connecting duct 70 can be arranged essentially in the center in the width direction Y. The connecting duct 70 can be arranged to extend rearward from the connecting portion with the battery 50 in the front-rear direction X.

The exhaust fan 80 generates air for cooling the battery 50. In the present embodiment, the exhaust fan 80 can be composed of a sirocco-type centrifugal fan, or the like. The intake port of the exhaust fan 80 can be connected to the connecting duct 70.

The exhaust duct 90 is configured to be able to discharge the air that has cooled the battery 50. The exhaust duct 90 is arranged between the floor panel bottom portion fp and the seating part 32 of the rear seat 30 that constitutes the seats 10. The exhaust duct 90 is arranged underneath the floor panel top portion 40; one end of the exhaust duct is connected to the exhaust port of the exhaust fan 80. The other end of the exhaust duct is arranged adjacent to the lower surface of the rear seat 30.

As shown in FIG. 6, the exhaust duct 90 includes a floor proximity portion 91, a rising portion 92, a seat proximity portion 93, and the exhaust port 94.

The floor proximity portion 91 is connected to the exhaust port of the exhaust fan 80 and is located adjacent to the floor panel top portion 40. The floor proximity portion 91 is configured in the form of a cavity extending essentially linearly along the front-rear direction X of the vehicle 100. In the present embodiment, the floor proximity portion 91 is configured such that an approximately rectangular cross section with rounded corners extending linearly in the front-rear direction X.

The rising portion 92 is shaped to connect the floor proximity portion 91 and the seat proximity portion 93. The rising portion 92 is configured to extend along the height direction Z. In the present embodiment, the rising portion 92 is configured as a shape that extends linearly not only in the height direction Z but also in the front-rear direction X and the width direction Y. However, the specific shape of the rising portion 92 is not limited in this way, and, in addition to the foregoing, may be shaped to extend linearly only in the height direction Z, for example.

The seat proximity portion 93 is configured to be disposed at a different height than the height of the floor proximity portion 91 in the height direction Z, specifically, at a higher position than the floor proximity portion 91. Thus, the seat proximity portion 93 is configured to be located closer than the floor proximity portion 91 to the lower surface of the seating part 32 of the rear seat 30.

The exhaust port 94 is configured to be located between the horizontal portion 41 of the floor panel top portion 40 and the seating part 32 of the rear seat 30 constituting the seats 10. The exhaust port 94 is configured as an opening at the end of the seat proximity portion 93. As shown in FIG. 6, the exhaust port 94 is configured to be arranged adjacent to the notch 34 of the seating part 32 of the rear seat 30. The exhaust port 94 is positioned in front of the rear end portion r of the seating part 32 in the front-rear direction X of the vehicle 100. In other words, the exhaust port 94 is configured to be positioned in front of the enlarged portion 36 in the front-rear direction X of the vehicle (see FIG. 7).

As described above, the battery cooling air discharge structure according to the present embodiment includes the floor panel bottom portion fp, the floor panel top portion 40, the seats 10, and the exhaust duct 90. The floor panel bottom portion fp constitutes the lower part of vehicle body B of the automobile (vehicle 100) and is configured to enable placement of the battery 50. The floor panel top portion 40 is located above the floor panel bottom portion fp and is configured such that the battery 50 can be disposed between the floor panel top portion and the floor panel bottom portion fp. The seats 10 are configured to be installed in a plurality of rows on the floor panel top portion 40, in the same manner as the front seats 20 and the rear seat 30. The exhaust duct 90 is configured to be able to discharge the air that has cooled the battery 50. The exhaust port 94 of the exhaust duct 90 is arranged between the floor panel top portion 40 and the seating part 32 of the rear seat 30 that constitutes the seats 10.

By means of this configuration, the cooling air that passes through the battery 50 and is discharged from the exhaust port 94 of the exhaust duct 90 passes between the floor panel top portion 40 and the seating part 32 of the rear seat 30 and is routed to the luggage space L. Since the cooling air is thus distributed to the rear of the seating part 32 of the rear seat 30 for the occupants, the cooling air discharged from the exhaust port 94 at the end of the exhaust duct 90 is diffused between the seating part 32 of the rear seat 30 and the floor panel top portion 40, the sound of the cooling air can be absorbed by the seating part 32 of the rear seat 30, and the speed of the air that flows from the seating part 32 to the luggage space L can be reduced, so that the sound of the cooling air is less likely to reach the occupants' ears. Therefore, the noise heard by the occupants due to the cooling air from the exhaust duct 90 can be suppressed.

Further, the seating part 32 of the rear seat 30 has the notch 34 formed by notching the lower surface. The exhaust duct 90 is configured so that at least the vicinity of the exhaust port 94 is located adjacent to the notch 34 in the seating part 32. By means of this configuration, it becomes possible to prevent or suppress the deformation of the exhaust duct 90 due to external force or impact received in the area of the exhaust port 94 of the exhaust duct 90, etc., when a passenger boards the vehicle 100 or when the vehicle 100 accelerates or decelerates.

Further, the seating part 32 of the rear seat 30 is provided with the notch 34, which is made by forming a concave cutout in the underside of the seating part. The notch 34 has the first concave portion 35, the enlarged portion 36, the second and third concave portions 37, 38, and the convex portion 39. The first concave portion 35 is configured to allow the adjacent placement of the exhaust port 94. The enlarged portion 36 is continuous with the first concave portion 35 and is configured so that that the cross-sectional shape of the notch from the first concave portion 35 is enlarged. The second concave portion 37 and the third concave portion 38 are continuous with the enlarged portion 36. The convex portion 39 bifurcates the notch connected to the enlarged portion 36 into the second and third concave portions 37, 38. By means of this configuration, there is no need to extend exhaust duct 90 to the luggage space L of the vehicle 100. As a result, when a passenger sits on the seating part 32 of the rear seat 30, he or she is less likely to feel a foreign object due to an extension of the exhaust duct 90; thus, the seating comfort is improved, and the cost of the exhaust duct can be decreased to the extent that the length of the exhaust duct 90 is reduced, thereby reducing the cost of the vehicle body.

Further, the second concave portion 37 and the third concave portion 38 comprising the notch 34 are configured to extend to the rear end portion r of the seating part 32 in the front-rear direction X of the vehicle 100. Thus, the notch 34 in the seating part 32 can guide the cooling air discharged from the exhaust duct 90 to the luggage space L or its vicinity.

Further, the exhaust port 94 of the exhaust duct 90 is located in front of the rear end portion r of the seating part 32 in the front-rear direction X of the vehicle 100. By means of this configuration, compared to a case in which the exhaust duct 90 is extended to the rear end portion r of the seating part 32, the cost of the exhaust duct, and thus the cost of the vehicle body, can be reduced.

The exhaust duct 90 also has the floor proximity portion 91 that is adjacent to the horizontal portion 41 of the floor panel top portion 40 and that extends along the front-rear direction X of the vehicle 100. By means of this configuration, the shape of the exhaust duct 90 can be simplified, and thus the cost of the exhaust duct, and that of the vehicle body, can be reduced.

The present invention is not limited to the embodiment described above, and various modifications are possible within the scope of the claims. In the description above, the floor proximity portion 91, the rising portion 92, and the seat proximity portion 93 of the exhaust duct 90 are described to have shapes in which a substantially elliptical cross-sectional shape is linearly extended, but no limitation is imposed thereby. As long as flow paths are appropriately formed in addition to the above, other shaped may be provided in these configurations, such as bent portions in the middle of each portion.

The invention claimed is:

1. A battery cooling air discharge structure comprising:
    a floor panel constituting a lower part of a vehicle body of a vehicle and enabling placement of a battery;
    a floor arranged above the floor panel to allow placement of the battery between the floor and the floor panel;
    a plurality of rows of seats arranged on the floor; and
    an exhaust duct configured to discharge battery cooling air from the battery,
    the exhaust duct having an exhaust port located between the floor and a seating part of a rear seat that constitutes the seats, an underside of the seating part having a notch, and at least an area of the exhaust port of the exhaust duct being located adjacent to the notch.

2. The battery cooling air discharge structure according to claim 1, wherein
    the notch is configured in a concave shape on the underside of the seating part, and
    the notch has a first concave portion that is located adjacent to the exhaust port of the exhaust duct, an enlarged portion continuous with the first concave portion and configured with a cross-sectional shape of the notch from the first concave portion is enlarged, a second concave portion and a third concave portion continuous with the enlarged portion, and a convex portion bifurcating the notch connected to the enlarged portion into the second concave portion and the third concave portion.

3. The battery cooling air discharge structure according to claim 2, wherein
    the second concave portion and the third concave portion extend to a rear end portion of the seating part in a front-rear direction of the vehicle.

4. The battery cooling air discharge structure according to claim 1, wherein
    the exhaust port is located in front of a rear end portion of the seating part in a front-rear direction of the vehicle.

5. The battery cooling air discharge structure according to claim 1, wherein
    the exhaust duct has a floor proximity portion that is adjacent to the floor and that extends along a front-rear direction of the vehicle.

* * * * *